Oct. 14, 1969   J. G. SIEKMAN ET AL   3,473,000
METHOD OF WELDING STRONGLY REFLECTING MATERIALS BY MEANS
OF A FOCUSSED BEAM OF ELECTROMAGNETIC RADIATION
Filed July 1, 1968

INVENTORS
JAKOB G. SIEKMAN
RUDOLF E. MORIJN
BY

AGENT

United States Patent Office 3,473,000
Patented Oct. 14, 1969

3,473,000
METHOD OF WELDING STRONGLY REFLECTING MATERIALS BY MEANS OF A FOCUSSED BEAM OF ELECTROMAGNETIC RADIATION
Jakob Gerard Siekman, Emmasingel, Eindhoven, and Rudolf Eduard Morijn, Eindhoven, Netherlands, assignors, by mesne assignments, to U.S. Philips Corporation, New York, N.Y., a corporation of Delaware
Filed July 1, 1968, Ser. No. 741,665
Claims priority, application Netherlands, July 15, 1967, 6709862
Int. Cl. B23k 9/08
U.S. Cl. 219—121                                    2 Claims

ABSTRACT OF THE DISCLOSURE

A method of welding together abutting articles consisting of a material which substantially reflects a beam of electromagnetic radiation in which a cavity is formed at the beginning of the welding seam between the articles which extends in the direction of the radiation and which has a cross-sectional area approximately the same as that of the beam.

---

Figure 1:
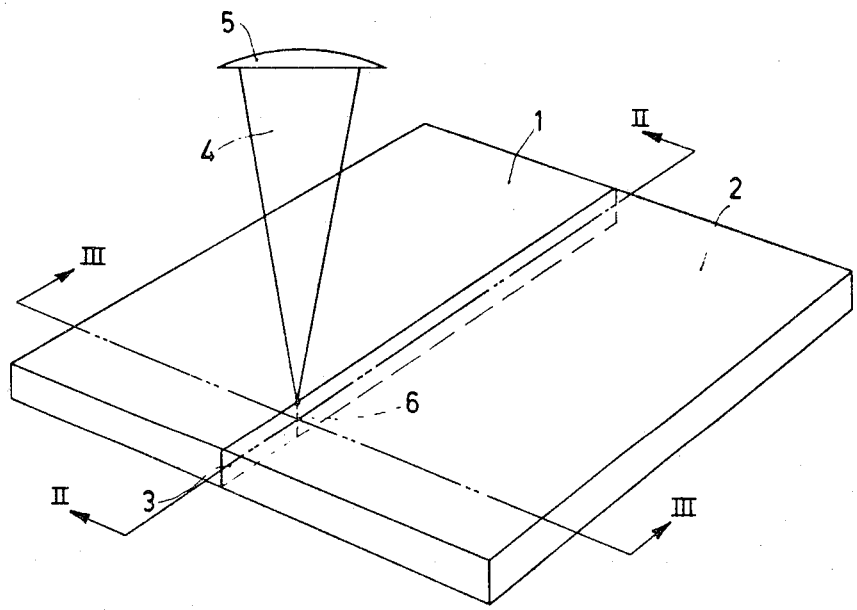

The invention relates to a method of welding strongly reflecting materials by means of a focussed beam of electromagnetic radiation, in which the articles to be welded together are joined without an intermediate space and without an auxiliary material.

In welding strongly reflecting materials such as metals by means of lasers and irasers (infra-red lasers), the problem arises that it is difficult to cause the energy to penetrate into the work-pieces.

Another method of welding, i.e. by means of an electron beam, does not involve this problem. However, this method has the disadvantage of a comparatively voluminous vacuum system and of a high voltage.

It is known to cut thin layers of metal, for example, of gold, on a support and to coat the metal with an aquadag layer to increase the absorption. However, in welding, such a coating would involve the disadvantage that the mechanical strength and/or the resistance to corrosion of the weld are adversely affected.

The invention has for an object to provide a method which has given advantages.

According to the invention, in a method of welding strongly reflecting materials by means of a focussed beam of electromagnetic radiation, in which the articles to be welded together are joined without an intermediate space and without an auxiliary material, a cavity extending in the direction of the focussed beam and having a cross-section approximately equal to that of the focussed beam is formed at the starting point of the welding seam to be produced.

It has been found that in a method of welding by means of an iraser, a cavity is formed at the area of the beam which follows the movement of the beam along the welding seam. In this cavity, reflections recur at the melting and partly also evaporating surface, as a result of which the energy of the beam is absorbed even if the undisturbed surface of the articles welded together has a high reflective power. The cavity artificially arranged in accordance with the invention at the same time acts as a black body so that the starting point of the welding seam can be obtained.

The cavity according to the invention can be formed in the simplest manner in that one of the surfaces bounding the welding seam is provided with a scratch or a groove extending in the correct direction and having a length approximately equal to the welding depth to be expected and a width of one to a few tenths of a millimeter.

Figure 2:
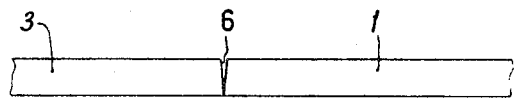
Figure 3:
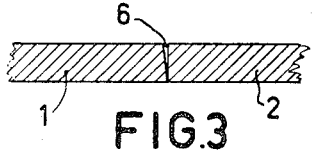

The invention will be described with reference to the drawing in which:

FIG. 1 shows two abutting articles being welded according to the invention;
FIG. 2 is sectional view of the assembly parallel to the welding seam in FIG. 1;
FIG. 3 is a sectional view of the assembly at right angles to the welding seam in FIG. 1.

In the figures, reference numerals 1 and 2 denote two plates of chromium-nickel steel having a thickness of 0.3 mm. and accurately fitting against one another. An iraser beam 4 having a strength of 65 w. is concentrated by means of a germanium lens 5 on the welding seam 3 at the area of the scratch 6 in the plate 1. This scratch 6 has a width of 0.2 mm.

What is claimed is:
1. A method of welding together without an auxiliary material abutting articles each consisting of a material which substantially reflects a focussed beam of electromagnetic radiation comprising the steps of, forming a cavity between said articles extending in the direction of said focussed beam and having a cross-section approximately equal to that of the focussed beam at a point corresponding to the beginning of the welding seam, and directing said beam of electromagnetic radiation at said articles in the direction of said cavity to weld said articles together.
2. A method of welding articles together as claimed in claim 1 in which the cavity is a groove having a length approximately equal to the welding depth and a width of the order of tenths of a millimeter.

References Cited
UNITED STATES PATENTS
3,304,403    2/1967    Harper _____ 219—121
3,387,109    6/1968    Bruma et al. _____ 219—121

OTHER REFERENCES
"Laser Beam Welding Electronic-Component Leads," by A. R. Pfluger et al.: Welding Research Supplement, June 1965, pp. 264S–269S (copy found in 219–121L).
"Theory and Application of Pulsed Laser Welding," by J. E. Anderson et al: Welding Journal, December 1965, pp. 1018–1026 (copy found in 219–121L).

JOSEPH V. TRUHE, Primary Examiner
W. D. BROOKS, Assistant Examiner